United States Patent [19]
Newman et al.

[11] Patent Number: 5,804,782
[45] Date of Patent: Sep. 8, 1998

[54] ELECTRICAL SWITCH HAVING A ROTARY MECHANISM FOR USE IN AN AUTOMOTIVE VEHICLE

[75] Inventors: LaVerne R. Newman, Southfield; James B. Wright, Warren; LeRoy A. Poleschuk, White Lake, all of Mich.

[73] Assignee: United Technologies Automotive, Inc., Dearborn, Mich.

[21] Appl. No.: 473,570

[22] Filed: Jun. 6, 1995

[51] Int. Cl.⁶ .................................................. H01N 9/00
[52] U.S. Cl. ................................ 200/61.27; 200/61.54
[58] Field of Search .......................... 200/11 A, 11 DA, 200/61.27–61.39, 61.54, 4, 17 R, 332, 335, 252, 253; 74/484 R

[56] References Cited

U.S. PATENT DOCUMENTS

| | | | |
|---|---|---|---|
| 3,586,796 | 6/1971 | Simovits, Jr. et al. | 200/67 |
| 4,689,450 | 8/1987 | Sawada | 200/6 R |
| 4,695,682 | 9/1987 | Winogrocki | 200/5 R |
| 4,780,580 | 10/1988 | Sawada | 200/68.2 |
| 4,890,037 | 12/1989 | Izawa et al. | 315/77 |
| 4,890,038 | 12/1989 | Kurozu et al. | 315/82 |
| 4,920,239 | 4/1990 | Buhler et al. | 200/61.54 |
| 4,929,806 | 5/1990 | Furuhashi et al. | 200/61.54 |
| 4,939,540 | 7/1990 | Kamada et al. | 335/190 |
| 5,049,706 | 9/1991 | DuRocher | 200/61.54 |
| 5,155,306 | 10/1992 | Iijima et al. | 200/11 DA |
| 5,200,584 | 4/1993 | Nagaya | 200/4 |
| 5,272,290 | 12/1993 | Suzuki et al. | 200/4 |
| 5,293,507 | 3/1994 | Hayakawa | 200/244 |
| 5,385,067 | 1/1995 | Wiersing et al. | 74/484 R |

FOREIGN PATENT DOCUMENTS 2246171  9/1973  France ............................. B60Q 1/34

OTHER PUBLICATIONS

Photographs of UTA/Ford turn signal switch (prior to Jun. 6, 1994).

*Primary Examiner*—Michael L. Gellner
*Assistant Examiner*—Michael A. Friedhofer
*Attorney, Agent, or Firm*—Harness, Dickey & Pierce, P.L.C.

[57] ABSTRACT

An electrical switch for use in an automotive vehicle includes a rotary carrier rotatable in response to engagement of a finger projecting from a movable main carrier. A detent structure is provided within a switch housing for engagement by a projection extending from the rotary carrier. The rotary carrier supports a conductive rotary contactor which is selectively actuable to conduct electrical current to a high beam headlamp conductive trace or a low beam headlamp conductive trace. The present invention provides a method for operating the electrical switch having a rotary mechanism. A channel is disposed between a plurality of conductive traces and the switch housing.

23 Claims, 8 Drawing Sheets

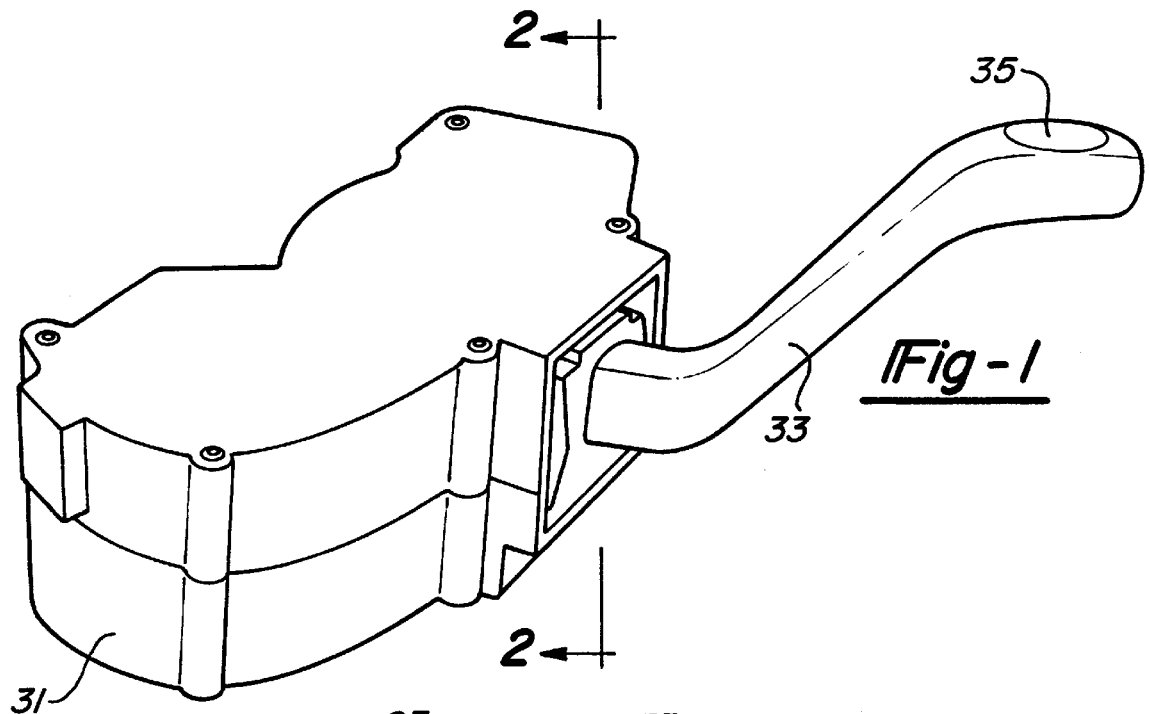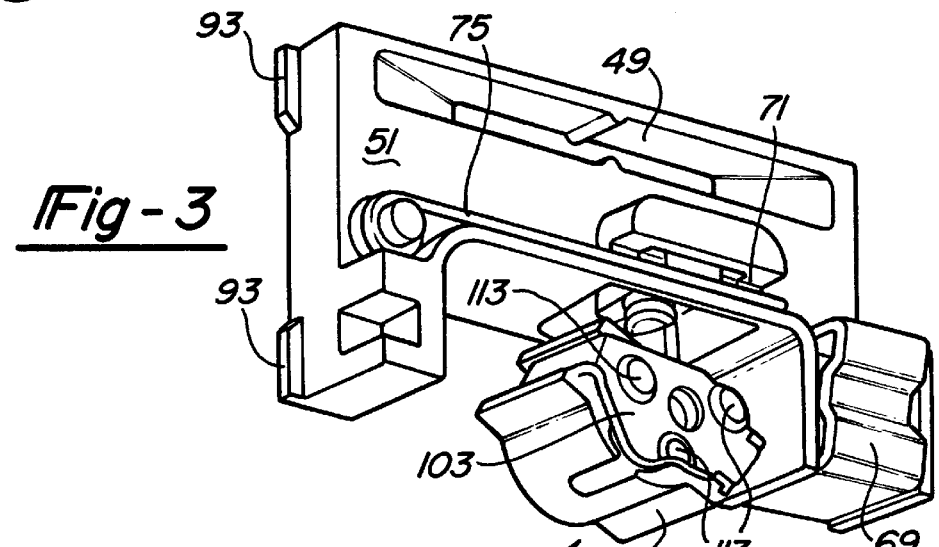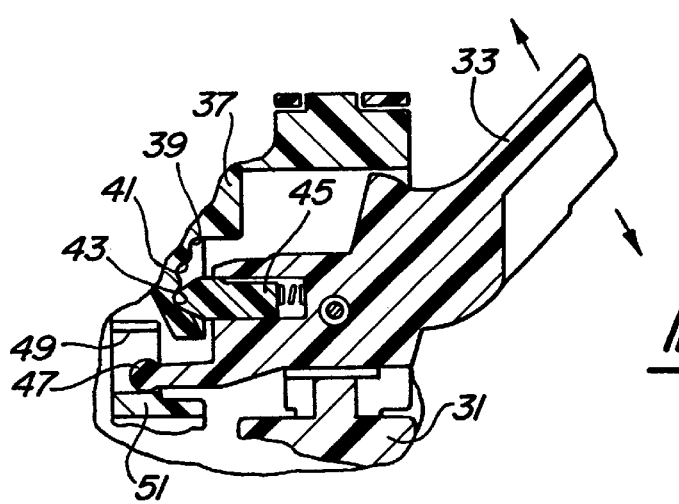

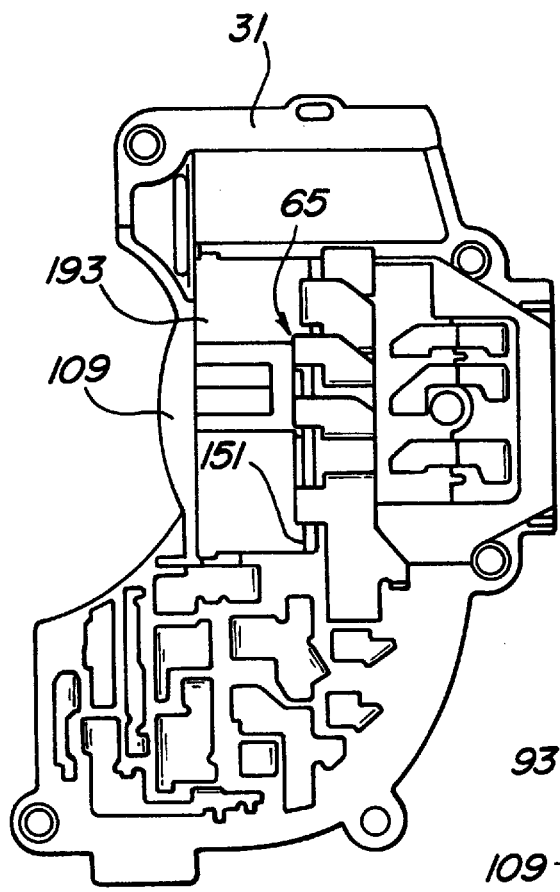
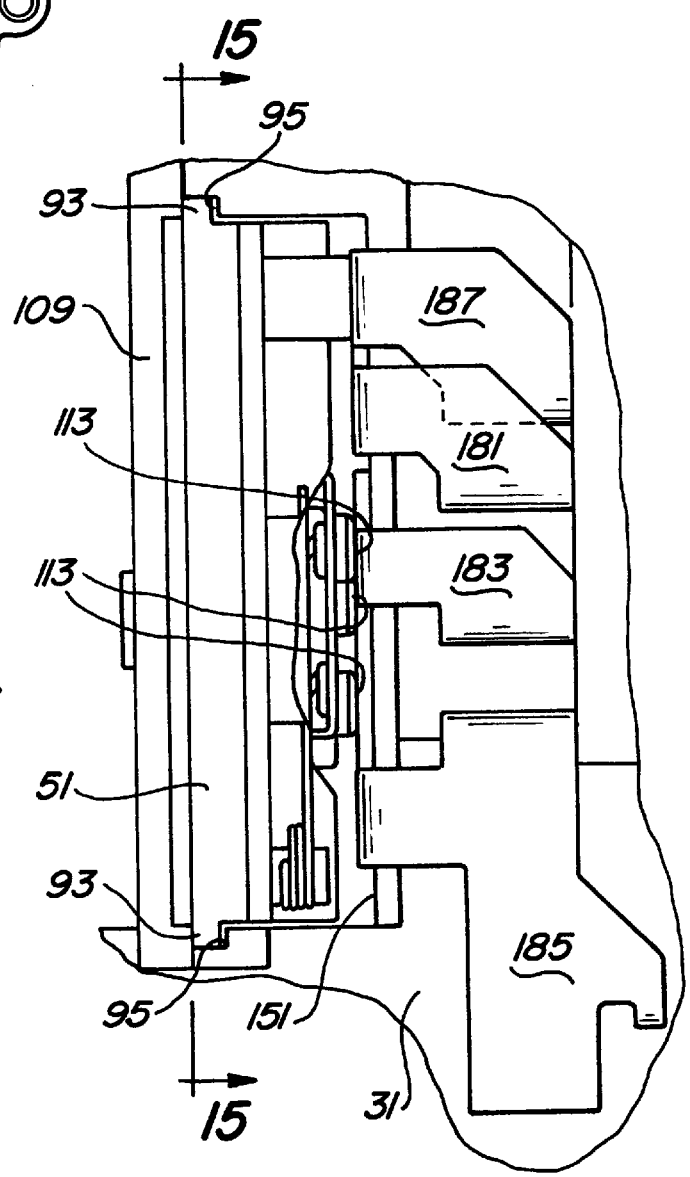

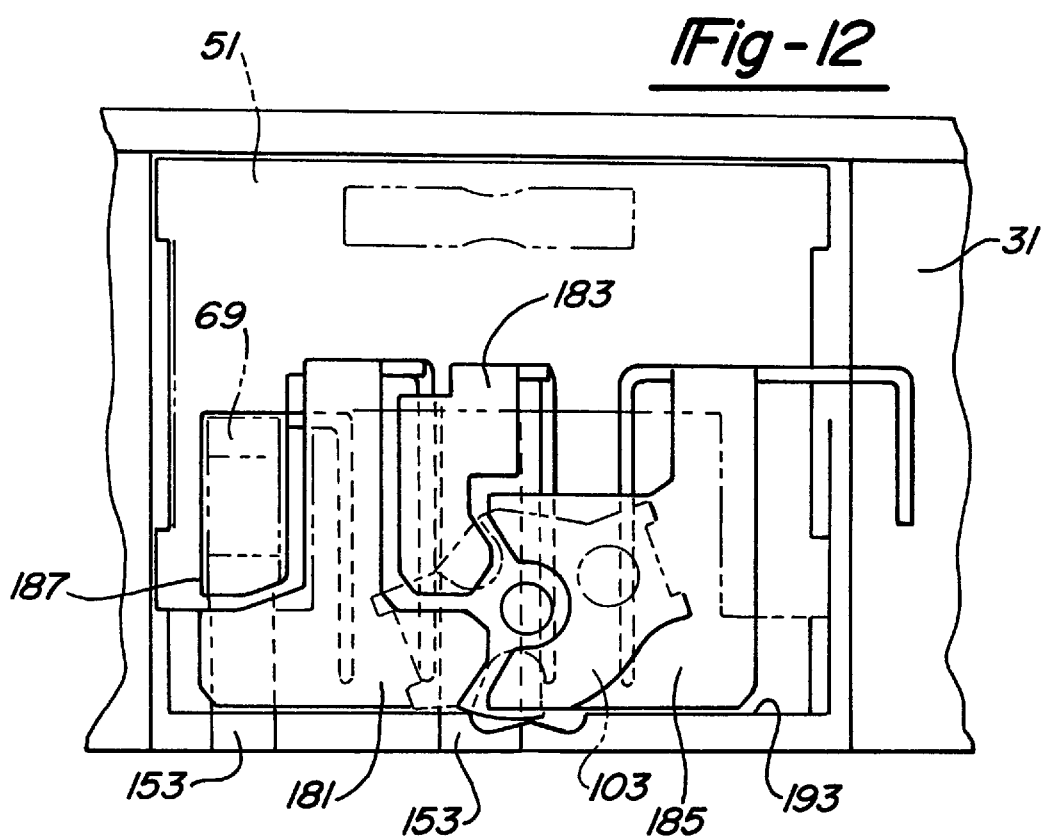

ELECTRICAL SWITCH HAVING A ROTARY MECHANISM FOR USE IN AN AUTOMOTIVE VEHICLE

BACKGROUND OF THE INVENTION

This invention relates generally to electrical switches and specifically to an electrical switch having a rotary mechanism for use in an automotive vehicle.

Within the automotive industry, it is common to provide rocker type switches for selectively conducting electrical current from a positive current electrically conductive terminal to a variety of other conductive terminals feeding window lift motors, interior reading lamps, radios or the like. It is also known to provide rocker switches having an internally mounted and spring biased plunger for selectively depressing against one or more portions of a fulcrummed contactor. Examples of such conventional devices are disclosed within U.S. Pat. No. 5,293,507 entitled "Movable Contact Piece Support Structure of a Seesaw Switch" which issued to Hayakawa on Mar. 8, 1994, and U.S. Pat. No. 3,586,796 entitled "Electrical Switch with Improved Common Terminal Housing Retaining Means for Pivoted Contact" which issued to Simovits, Jr. on Jun. 22, 1971.

A traditional construction for a high beam/low beam headlamp dimmer switch is shown in U.S. Pat. No. 5,385,067 entitled "Turn Signal Cancellation Mechanism" which issued to Wiersing et al. on Jan. 31, 1995, which is assigned to the assignee of the present invention and is incorporated by reference herewithin. This patent discloses a driven end of a turn signal handle that engages within a slot of a carrier. A compression spring loaded contactor is mounted upon this carrier for electrical engagement between a plurality of conductive stamping.

It is also known to employ a foot actuated head lamp dimmer switch upon the floor boards of older vehicles. Depression of this large switch actuates a pair of plungers, each biased by approximately one-half inch diameter springs, for toggling a large pivoting contactor. In general, these foot actuated dimmer switches lack precision of movement, electrical reliability, low travel actuation and high effort actuation.

SUMMARY OF THE INVENTION

In accordance with the present invention, a preferred embodiment of an electrical switch for use in an automotive vehicle includes a rotary carrier rotatable in response to engagement of a finger projecting from a movable main carrier. In another aspect of the present invention, a detent structure is provided within a switch housing for engagement by a projection extending from the rotary carrier. In a further aspect of the present invention, the rotary carrier supports a conductive rotary contactor which is selectively actuable to conduct electrical current to a high beam headlamp conductive trace or a low beam headlamp conductive trace. Yet another aspect of the present invention provides a method for operating the electrical switch having a rotary mechanism. In still another aspect of the present invention, a channel is disposed between a plurality of conductive traces and the switch housing.

The present invention is advantageous over conventional designs since the electrical switch of the present invention provides a cock-and-fire mechanism for achieving low travel actuation of an electrical switch such as a high beam/low beam headlamp dimmer switch. Furthermore, the high beam/low beam switch of the present invention also feels crisp upon actuation. Another advantage of the present invention is that minimal forces are required to actuate the switch due to the part geometries and cock-and-fire mechanism. The rotary mechanism further causes less electrical errosion of the conductive traces as compared to traditional linear contactor movement which causes excessive friction and travel as well as electrical arcing. The electrical switch of the present invention also achieves a more reliable electrical contact. It is further noteworthy that the present invention can be easily preassembled without the traditional fear of the compression springs exploding components away from each other during assembly. Moreover, the channels provide a receptacle for undesired debris created within most switches during electrical arcing; this allows for a cleaner contact surface between the rotary contactor and the conductive traces. Additional advantages and features of the present invention will become apparent from the following description and appended claims, taken in conjunction with the accompanying drawings.

BRIEF DESCRIPTION OF THE DRAWINGS

FIG. 1 is a perspective view of a turn signal cancellation mechanism within which the preferred embodiment of an electrical switch of the present invention is employed;

FIG. 2 is a cross sectional view, taken along line 2—2 of FIG. 1, showing a turn signal handle engaging a portion of the preferred embodiment electrical switch of the present invention;

FIG. 3 is a perspective view showing a portion of the preferred embodiment electrical switch of the present invention;

FIG. 10 is a top elevational view showing a housing and conductive traces employed in the preferred embodiment electrical switch of the present invention;

FIG. 11 s an enlarged and fragmentary top elevational view showing the preferred embodiment electrical switch of the present invention;

FIG. 12 is a side elevational view, with a portion of the housing broken away therefrom, showing the preferred embodiment electrical switch of the present invention;

DETAILED DESCRIPTION OF THE PREFERRED EMBODIMENT

Figure 4:
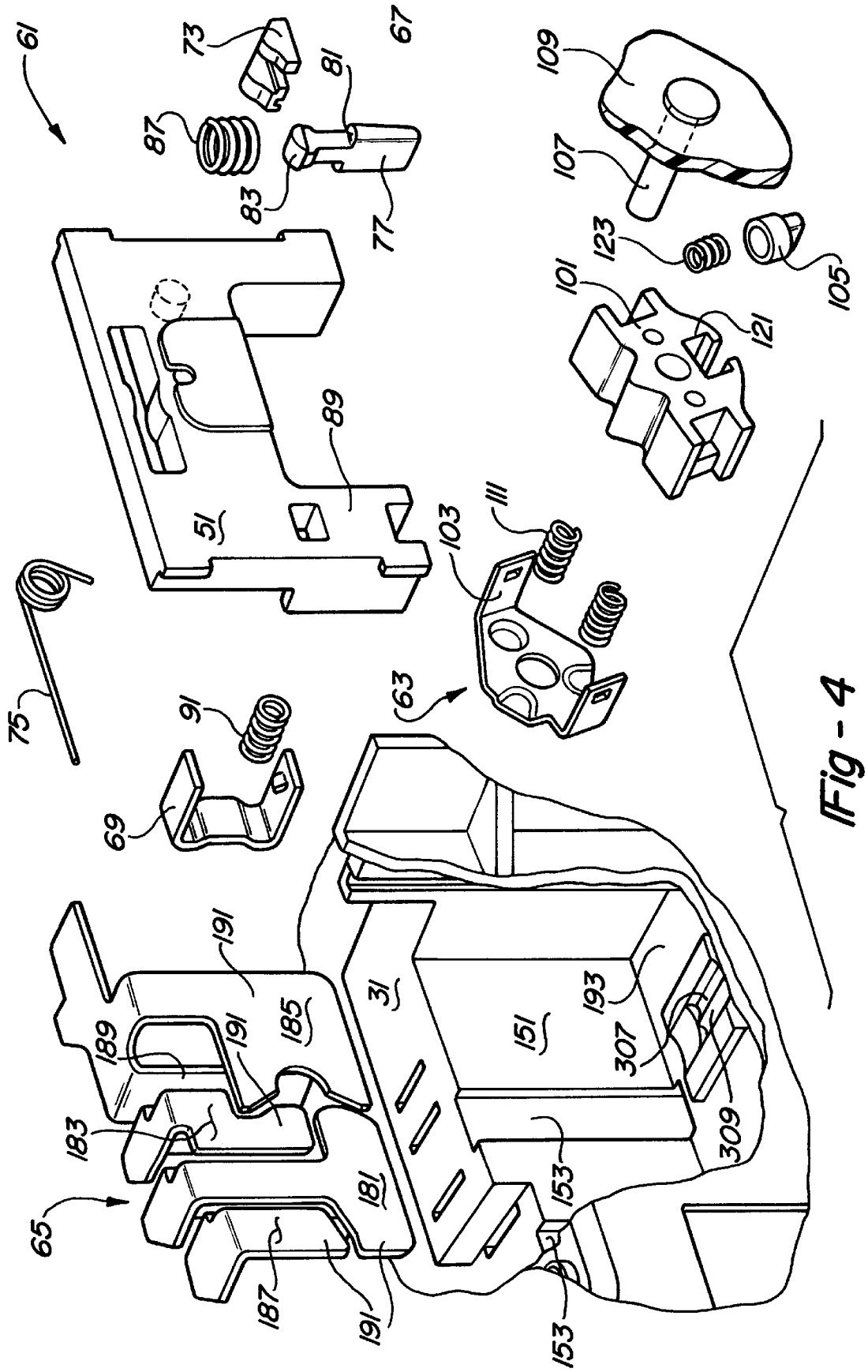
FIG. 4 is an exploded perspective view, taken opposite that of FIG. 3, showing the preferred embodiment electrical switch of the present invention.
Figure 5:
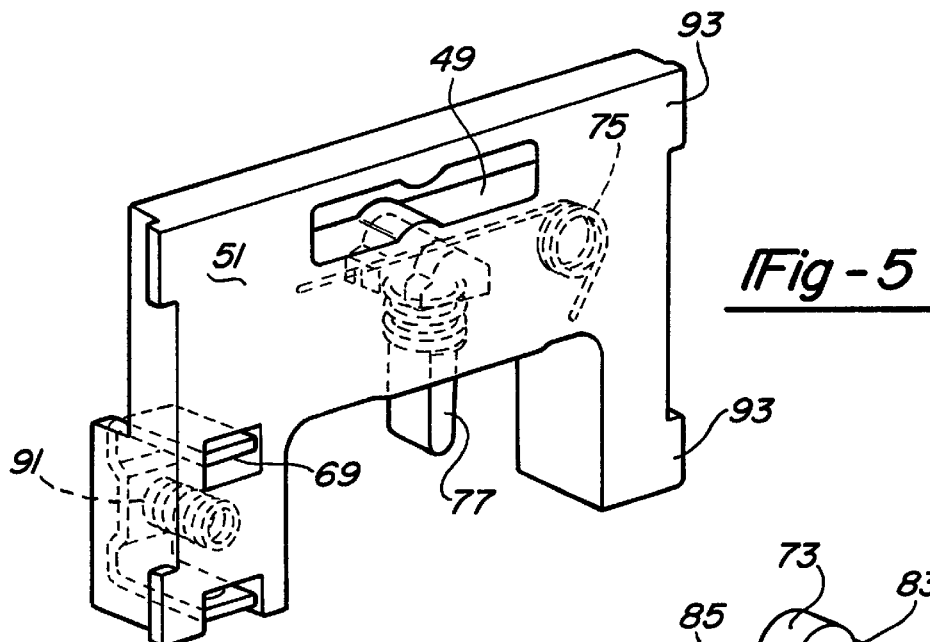
FIG. 5 is a perspective view, taken opposite that of FIG. 3, showing the preferred embodiment electrical switch of the present invention.
Figure 6:
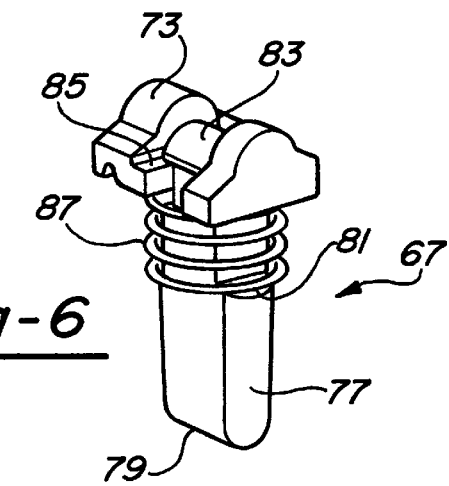
FIG. 6 is an enlarged perspective view showing a finger employed in the preferred embodiment electrical switch of the present invention.
Figure 9:
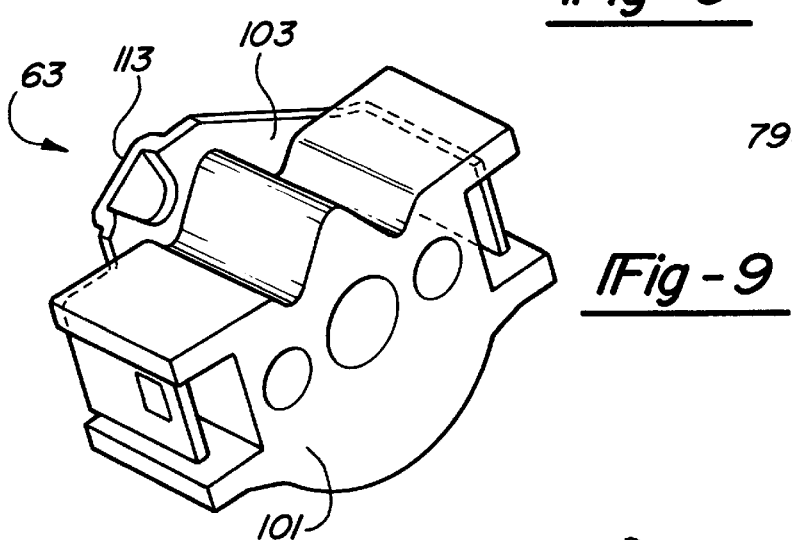
FIG. 9 is an enlarged perspective view, taken opposite that of FIG. 3, showing a rotary mechanism employed in the preferred embodiment electrical switch of the present invention.
Figure 7:
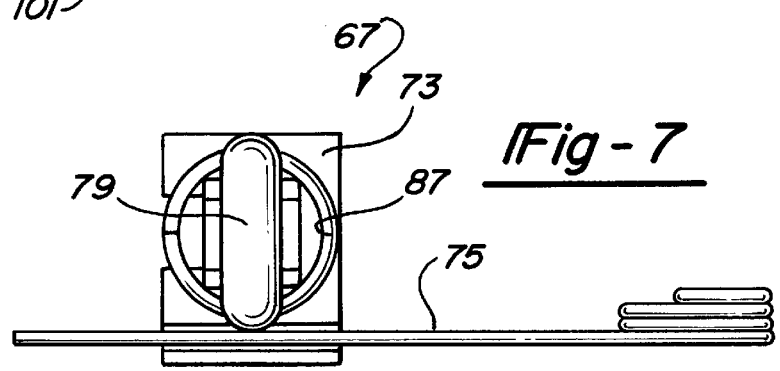
FIG. 7 is an enlarged top elevational view showing a spring and the finger employed in the preferred embodiment electrical switch of the present invention.

A turn signal cancellation mechanism for use in an automotive vehicle is shown in FIGS. 1 and 2. This device includes a housing 31 mounted to a vehicle steering column and a turn signal handle 33 having a driver accessible end 35. Handle 33 is pivotable about the arrows shown in FIG. 2 for operating a flash-to-pass headlamp feature and a high beam/low beam headlamp dimming switch feature. An actuator 37 is provided which contains a nominal detent position 39, a flash-to-pass detent position 41 and a high beam/low beam switching detent position 43. A spring biased plunger 45 within handle 33 engages with one of these detent positions. A driven end 47 of handle 33 is engagably received within a slot 49 within a main carrier 51.

Referring now to FIGS. 3–7, the preferred embodiment of an electrical switch 61 of the present invention includes a rotary mechanism 63, a plurality of conductive traces 65, a finger 67, and a linear contactor 69, as well as housing 31 and main carrier 51. Main carrier 51 has a centrally positioned interior chamber 71 for receiving a cap 73 of finger 67. A preloaded clock spring 75 upwardly biases cap 73 against receptacle 71 of main carrier 51. Finger 67 further has an elongated lever 77 with a tip 79, a pair of shoulders 81 and a head 83. Head 83 movably rests along an internal shell 85 of cap 73 while a compression spring biases shoulders 81 of lever 77 away from a lower surface of cap 73. Compression spring 87 and clock spring 75 act to center finger 67 in relation to main carrier 51. As will be discussed in greater detail hereinafter, the biased interaction between finger 67, a rotary carrier 101 and detent formations 307 and 309, defines the cock and fire mechanism.

Return flanges of linear contactor 69 are movably received within a leg 89 of main carrier 51. A compression spring 91 is also located between leg 89 of main carrier 51 and a depressed center of linear contactor 69 for biasing linear contactor 69 away from main carrier 51 and toward various of the plurality of conductive traces 65. Main carrier 51 further has four lateral flanges 93 for slidably engaging within a pair of facing tracks 95 integrally molded within housing 31.

Rotary mechanism 63 includes rotary carrier 101, a rotary contactor 103 and a projection or plunger 105. Rotary contactor 103 is secured to rotary carrier 101 for rotation therewith about a boss 107 integrally or separately attached to a segment 109 of housing 31. A pair of compression springs 111 serve to bias rotary contactor 103 away from rotary carrier 101 and toward various of the conductive traces 65. Rotary contactor 103 also has three raised contact points 113 extending from a nominal surface thereof. Plunger 105 is outwardly biased from within a groove 121 of rotary carrier 101 by a compression spring 123.

Segment 109 can be integrally molded as part of the remainder of housing 31 or may be separately applied to the remainder of housing 31 by sonic welding, heat staking, snap fitting or the like after rotary mechanism 63 and main carrier 51 have been preassembled thereto. Preassembly of these switching components to segment 109 achieves a modularized unit thereby promoting easy access and vision during assembly so as to reduce assembly cost and scrap while improving placement, accuracy and quality.

A supporting surface 151 of housing 31 has a pair of channels 153 integrally molded therein behind the plurality of conductive traces 65. This is illustrated in FIGS. 4 and 10–12. These channels 153 act to receive burned plastic, grease, metal oxides and other debris created during electrical arcing during switching and from the often dusty environment within which automotive vehicles are commonly used. These channels 153 aid in reducing debris build up between the contactors and conductive traces 65. Conductive traces 65 include a high beam headlamp stamping 181, a low beam headlamp stamping 183, a first positive current stamping 185 and a second positive current stamping 187. All of these stampings include substantially parallel electrical connector blades 189 for disengagably connecting to a wire harness electrical connector (not shown). Furthermore, all of these conductive traces 65 terminate in a contact section 191 disposed in a co-planar manner along surface 151 of housing 31. Unlike many traditional head lamp high beam/low beam switch constructions, such as that disclosed within the aforementioned U.S. Pat. No. 5,385,067, the conductive traces do not extend along a bottom surface 193 of the switch receiving cavity of housing 31. This provides for more efficient trace packaging and lower part costs.

Housing 31, rotary carrier 101, and main carrier 51 are all preferably injection molded from glass filled nylon such as DuPont Zytel® grade 70G30. Contactors 69 and 103 as well as conductive traces 67 are all preferably stamped from CA10194 copper.

Figure 8:
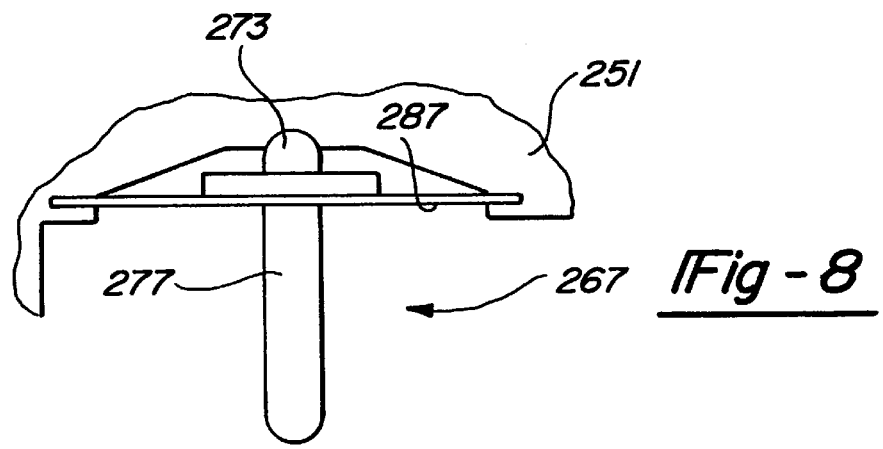
FIG. 8 is a fragmentary side elevational view showing an alternate embodiment finger and spring employed in the electrical switch of the present invention.

An alternate embodiment of finger 267 is shown in FIG. 8. This finger embodiment employs a lever 277 integrally molded with cap 273. A leaf spring 287 has both ends captured within slots in a main carrier 251 and serves to center and retain finger 267 in relation to main carrier 251.

Figure 13:
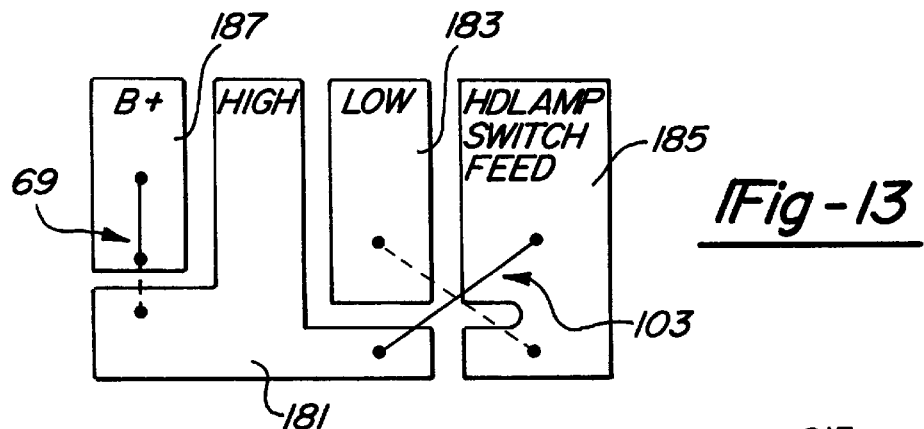
FIG. 13 is a diagrammatic side elevational view showing an interaction between movable contactors and the conductive traces employed in the preferred embodiment electrical switch of the present invention.
Figure 14:
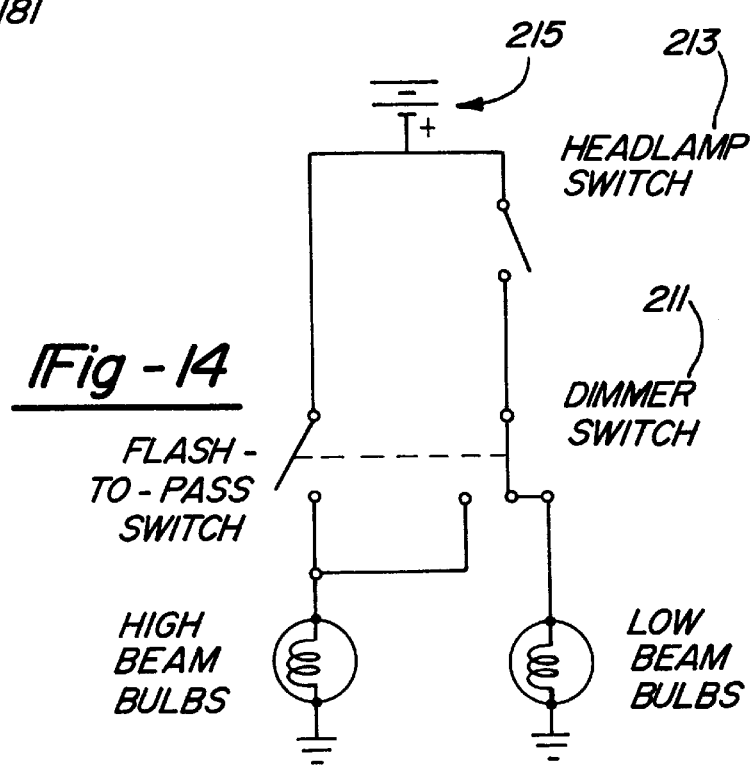
FIG. 14 is an electrical schematic diagram for the preferred embodiment electrical switch of the present invention.

Referring to FIGS. 12–14, the high beam/low beam dimmer switch function 211 is achieved by rotation of rotary contactor 103 between high beam stamping 181 and low beam stamping 183. Rotary contactor 103 is always in electrical contact with first positive current stamping 185 which is electrically connected to a headlamp on/off switch 213. Meanwhile, a flash-to-pass switching function is achieved by linear movement of linear contactor 69 between second positive current stamping 187 and high beam headlamp stamping 181. A vehicle battery 215 is always feeding electrical current (B+) to second positive current stamping 187.

Figure 15:
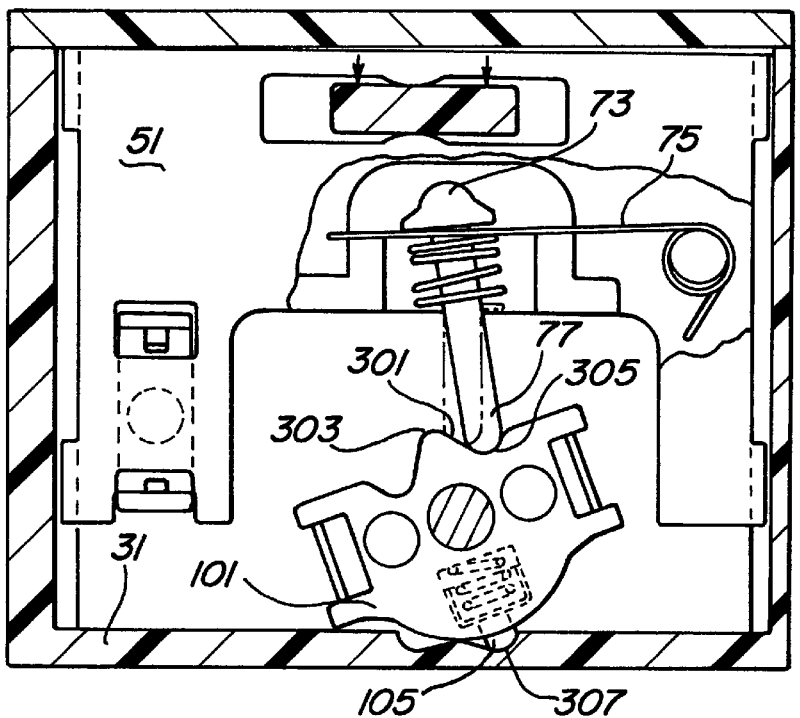
FIGS. 15–18 are cross sectional views, taken along line 15—15 of FIG. 11, showing a series of operational positions of the preferred embodiment electrical switch of the present invention.
Figure 16:
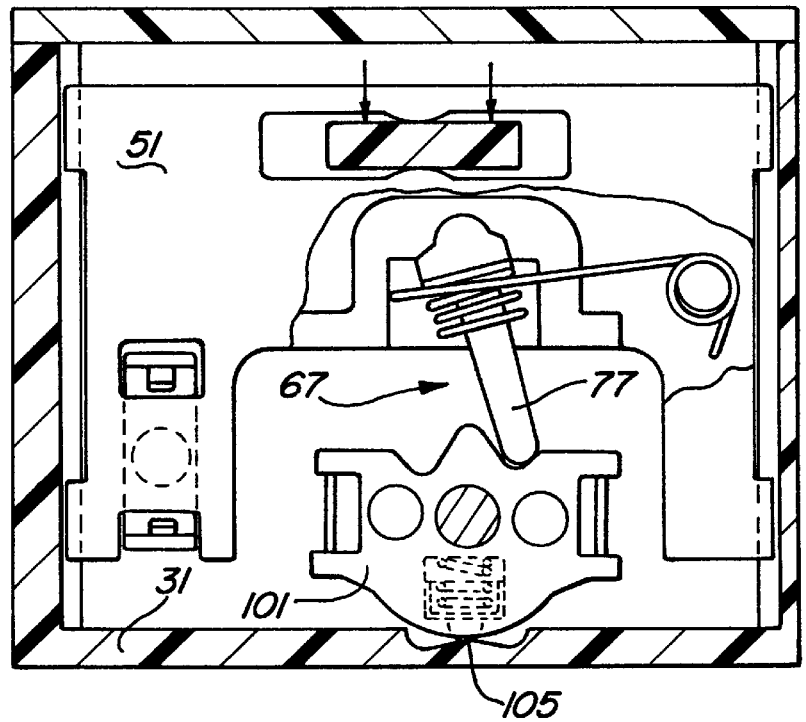
Figure 17:
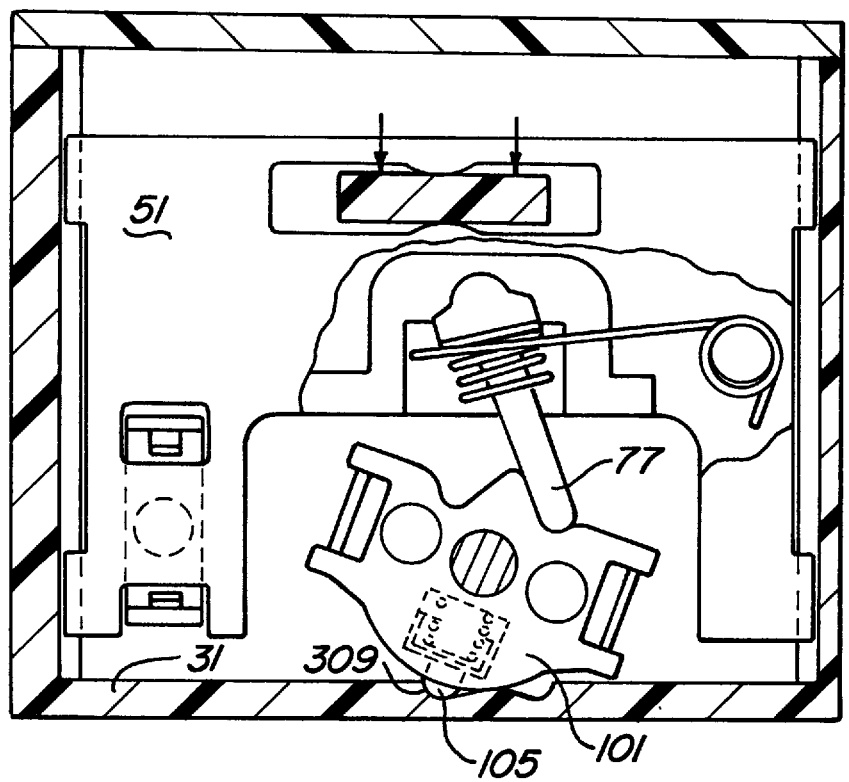
Figure 18:
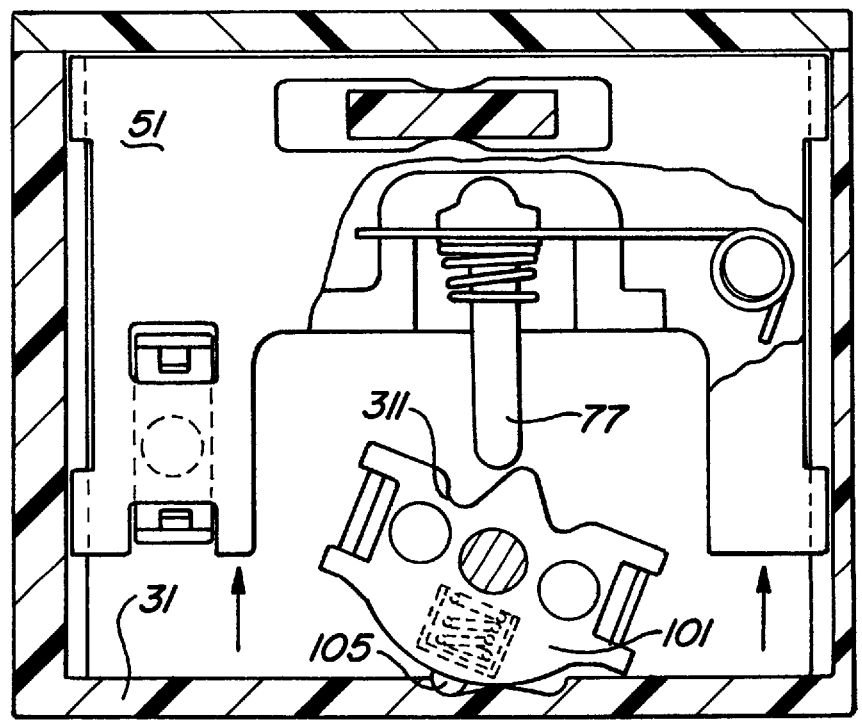

The operation of the cock and fire mechanism aspect of the present invention can best be observed in FIGS. 15–18. FIG. 15 illustrates main carrier 51 being moved toward rotary carrier 101 such that lever 77 has slid down a sloping surface 301, defined between a peak 303 and a first engagement surface 305 of rotary carrier 101. Rotary carrier 101 is shown disposed in a high beam rotated position such that plunger 105 engages a high beam detent formation 307. FIG. 16 illustrates lever 77 pushing, and thereby rotating, rotary carrier 101 as main carrier 51 continues to move toward rotary carrier 101. Finger 67 is in its fully cocked position. Referring now to FIG. 17, main carrier 51 is shown fully moved toward rotary carrier 101 such that lever 77 is fully pivoted, or has been fired, and rotary carrier 101 has been moved to a low beam rotated position. In this position, plunger 105 has engaged a low beam detent formation 309 within housing 31. FIG. 18 shows main carrier 51 moving away from rotary carrier 101 such that lever 77 is returned to its nominal central position. Returned linear movement of main carrier 51 toward rotary carrier 101 will subsequently engage lever 77 with an opposite engagement surface 311 for rotating rotary carrier 101 back to the rotated position shown in FIG. 15. Lever 77 does not need to engage rotary carrier 101 when only the flash-to-pass function is being operated.

While the preferred embodiment of this electrical switch has been disclosed, it will be appreciated that various modifications may be made without departing from the present invention. For example, the main carrier could pivot in relation to the housing as long as it serves to operate a rotary mechanism operable for switching between high beam and low beam modes. Furthermore, the disclosed cock and fire mechanism can be employed in a variety of other non-headlamp switches. Many other finger, contactor, carrier and conductive trace shapes and motions may be employed as long as the various aspects of the present invention are achieved. Various materials have been disclosed in an exemplary fashion, however, other materials may of course be employed. It is intended by the following claims to cover these and any other departures from the disclosed embodiments which fall within the true spirit of this invention.

The invention claimed is:

1. An electrical switch for use in an automotive vehicle, said electrical switch comprising:
   a rotary carrier supporting a conductive rotary contactor;
   a main carrier movable in a linear direction;
   a finger projecting from said main carrier;
   said rotary carrier rotating in a first direction when said main carrier linearly moves toward said rotary carrier for engaging said finger with said rotary carrier a first time;
   said rotary carrier remaining in a first rotated position when said main carrier linearly moves away from said rotary carrier a first time;
   said rotary carrier rotating in a second direction when said main carrier linearly moves toward said rotary carrier for engaging said finger with said rotary carrier a second time;
   said rotary carrier remaining in a second rotated position when said main carrier linearly moves away from said rotary carrier a second time;
   a switch housing having a detent structure defined by at least two detent formations; and
   a projection extending from said rotary carrier for movably engaging within one of said detent formations thereby maintaining said rotary carrier in said rotated positions.

2. The electrical switch of claim 1 further comprising:
   a switch housing;
   a high beam headlamp conductive trace disposed within said housing;
   a low beam headlamp conductive trace disposed within said housing;
   a positive current conductive trace disposed within said housing; and
   said rotary contactor mounted on said rotary carrier operably conducting electrical current between said positive conductive trace and one of said headlamp conductive traces depending on a selected one of said rotated positions.

3. The electrical switch of claim 2 further comprising a linear contactor mounted upon said main carrier, said linear contactor operable for conducting current between a second positive current conductive trace and one of said headlamp conductive traces.

4. The electrical switch of claim 1 further comprising:
   a spring biasing said finger toward a centralized position, said finger pivotable in relation to said main carrier; and
   said rotary carrier including a central peak and engagement surfaces juxtapositioned adjacent thereto, a tip of said finger riding along a sloping surface between said peak and one of said engagement surfaces located closest to said finger, said tip subsequently pushing said one of said engagement surfaces thereby rotating said rotary carrier during linear movement of said main carrier toward said rotary carrier.

5. The electrical switch of claim 4 wherein said finger further includes:
   a cap having an internal shelf;
   an elongated lever having a head for resting upon said shelf, said lever further having a pair of shoulders and said tip; and
   a compression spring disposed between a lower surface of said cap and said shoulders of said lever;
   whereby said tip of said lever can be compressed toward said cap.

6. The electrical switch of claim 1 further comprising:
   a switch housing within which said main carrier and said rotary carrier are disposed, a pair of facing tracks formed in said housing slidably engaging said main carrier therebetween; and
   a turn signal handle pivotable in relation to said housing, said handle being defined as an elongated and relatively thin member having a vehicle occupant accessible end and a driven end, said driven end hidden within said housing and engaging a portion of said main carrier, said main carrier linearly moving in response to pivoting movement of said handle.

7. An electrical switch for use in an automotive vehicle comprising:
   a rotary carrier supporting a conductive rotary contactor;
   a finger protecting from a main carrier, said finger being pivotable in relation to said main carrier; and
   a spring engaging and biasing said finger toward a nominal position;
   said rotary carrier including sloping surfaces declining toward engagement surfaces, a tip of said finger operably and selectively riding along a closest one of said sloping surfaces and subsequently pushing a closest one of said engagement surfaces thereby rotating said rotary carrier during movement of said main carrier.

8. The electrical switch of Claim 7 further comprising:
   a switch housing;
   a high beam headlamp conductive trace disposed within said housing;
   a low beam headlamp conductive trace disposed within said housing;
   a positive current conductive trace disposed within said housing; and
   said rotary contactor mounted on said rotary carrier operably conducting electrical current between said positive conductive trace and one of said headlamp conductive traces depending on a selected one of multiple rotated positions.

9. The electrical switch of claim 8 further comprising a main contactor mounted upon said main carrier, said main contactor operable for conducting current between a second positive current conductive trace and one of said headlamp conductive traces for providing a flash-to-pass headlamp function.

10. The electrical switch of claim 7 wherein said finger further includes:
a cap having an internal shelf;
an elongated lever having a head for resting upon said shelf, said lever further having a pair of shoulders and said tip; and
a compression spring disposed between a lower surface of said cap and said shoulders of said lever;
whereby said tip of said lever can be compressed toward said cap.

11. The electrical switch of claim 7 further comprising:
a switch housing within which said main carrier and said rotary carrier are disposed, a pair of facing tracks formed in said housing slidably engaging said main carrier therebetween; and
a turn signal handle pivotable in relation to said housing, said handle being defined as an elongated and relatively thin member having a vehicle occupant accessible end and a driven end, said driven end hidden within said housing and engaging a portion of said main carrier, said main carrier linearly moving in response to pivoting movement of said handle.

12. The electrical switch of claim 7 further comprising:
a switch housing having a detent structure defined by at least two detent formations; and
a projection extending from said rotary carrier for movably engaging within one of said detent formations thereby maintaining said rotary carrier in said rotated positions.

13. An electrical switch for use in an automotive vehicle, said electrical switch comprising:
a high beam headlamp conductive trace disposed within said housing;
a low beam headlamp conductive trace disposed within said housing;
a positive current conductive trace disposed within said housing;
said high beam, low beam and positive current conductive traces all terminating in contact sections coplanar with one another and all of said contact sections being positioned against a single surface of said housing, a portion of said low beam trace substantially located between said positive conductive trace and said high beam trace;
said contact section of said high beam headlamp conductive trace having a substantially T-shaped configuration; and
a rotary contactor conducting electrical current between said positive conductive trace and one of said headlamp conductive traces depending on a selected rotated position of said rotary contactor.

14. The electrical switch of claim 13 wherein said positive current conductive trace is electrically connected to a headlamp on/off switch.

15. A lamp dimmer switch comprising:
a contactor movable between various beam intensity conductive traces;
a cock and fire mechanism selectively actuable for causing movement of said contactor;
a rotary carrier coupled to said contactor;
a switch housing having at least two detent formations; and
a projection extending from said rotary carrier for movably engaging with one of said detent formations thereby maintaining said rotary carrier in rotated positions.

16. A lamp dimmer switch comprising:
a contactor movable between various beam intensity conductive traces;
a pivotable finger;
a spring engaging and biasing said finger toward a centralized position; and
a rotary carrier including a central peak and adjacent engagement surfaces, a tip of said finger riding along a sloping surface between said peak and one of said engagement surfaces located closest to said finger, said tip subsequently pushing said one of said engagement surfaces thereby rotating said rotary carrier.

17. The lamp dimmer switch of claim 16 wherein said finger includes:
a cap having an internal shelf;
an elongated lever having a head for resting upon said shelf, said lever further having a pair of shoulders and said tip; and
a compression spring disposed between a lower surface of said cap and said shoulders of said lever;
whereby said tip of said lever can be compressed toward said cap.

18. The lamp dimmer switch of claim 15 wherein said conductive traces further include:
a high beam headlamp conductive trace at least partially disposed within said housing;
a low beam headlamp conductive trace at least partially disposed within said housing; and
a positive current conductive trace at least partially disposed within said housing;
said contactor being mounted on said rotary carrier for operably conducting electrical current between said positive conductive trace and one of said headlamp conductive traces depending on a selected rotated position of said rotary carrier.

19. An electrical switch comprising:
a switch housing;
a high beam headlamp conductive trace;
a low beam headlamp conductive trace;
a positive current conductive trace;
a plurality of channels depressed within a single surface of said switch housing for providing localized gaps between said switch housing and said conductive traces;
said high beam, low beam and positive current conductive traces all terminating in contact sections coplanar with one another and all of said contact sections being positioned against said single surface of said switch housing; and
at least a portion of at least one of said traces extending over an adjacent one of said channels.

20. The electrical switch of claim 19 further comprising:
a contactor movable between various beam intensity ones of said conductive traces; and
a cock and fire mechanism selectively actuable for causing movement of said contactor.

21. A method for operating an electrical switch for use in an automotive vehicle, said method comprising the steps of:
(a) rotating a rotary carrier in a first rotational direction when moving a main carrier in a first linear direction thereby engaging a finger extending from said main carrier with said rotary carrier;
(b) maintaining said rotary carrier in a first rotated position when moving said main carrier linearly away from said rotary carrier in a second linear direction;

(c) rotating said rotary carrier in a second rotational direction when moving said main carrier linearly toward said rotary carrier thereby engaging said finger with said rotary carrier a second time; and (d) maintaining said rotary carrier in a second rotated position when moving said main carrier linearly away from said rotary carrier a second time;

(e) biasing said finger toward a neutral position;

(f pivoting said finger in relation to said main carrier upon engagement of said finger with said rotary carrier;

(g) sliding a tip of said finger along a sloping surface of said rotary carrier;

(h) cocking said finger by pushing a tip of said finger toward a body of said main carrier; and (i) firing said finger thereby Pushing an engagement surface of said rotary carrier by said tip of said finger during linear movement of said main carrier toward said rotary carrier.

22. The method of claim 21 further comprising the steps of:

(a) conducting electrical current between a positive current conductive trace and a high beam headlamp conductive trace when said rotary carrier and a rotary contactor mounted thereon are rotated to said first rotated position; and (b) conducting electrical current between said positive current conductive trace and a low beam headlamp conductive trace when said rotary carrier and said rotary contactor are rotated to said second rotated position.

23. The method of claim 21 further comprising the steps of:

(a) linearly sliding a linear contactor disposed on said main carrier from a nonconductive position to a conductive position; and (b) conducting electrical current to one of said headlamp conductive traces upon movement to said conductive position.

* * * * *